United States Patent [19]
Baer et al.

[11] Patent Number: 5,093,626
[45] Date of Patent: Mar. 3, 1992

[54] CONTACT MEASURING DEVICE FOR DETERMINING THE DRY FILM THICKNESS OF A PAINT ON A CONDUCTIVE PRIMER ADHERED TO A PLASTIC SUBSTRATE

[75] Inventors: James A. Baer, Menlo Park, Calif.; Allan F. Falcoff, Lake Orion, Mich.; Jan H. Kremers, Boulder Creek; James R. Young, Palo Alto, both of Calif.

[73] Assignee: E. I. DuPont de Nemours and Company, Wilmington, Del.

[21] Appl. No.: 522,135

[22] Filed: May 11, 1990

[51] Int. Cl.$^5$ .................. G01R 27/02; G01R 27/26
[52] U.S. Cl. ................................. 324/671; 324/683; 324/690; 324/709
[58] Field of Search .............. 324/663, 671, 686-688, 324/690, 683, 715-718, 551, 554, 557, 699, 709; 427/10; 118/712

[56] References Cited

U.S. PATENT DOCUMENTS

| | | | |
|---|---|---|---|
| 2,811,691 | 10/1957 | Dahm et al. | 324/715 X |
| 3,801,900 | 4/1974 | Szasz | 324/671 |
| 4,546,310 | 10/1985 | Chatanier et al. | 324/718 X |
| 4,682,105 | 7/1987 | Thorn | 324/686 X |
| 4,881,025 | 11/1989 | Gregory | 324/671 X |

OTHER PUBLICATIONS

"Measuring Thickness of Coatings on Metals", NASA Tech Briefs, May/Jun. 1986, pp. 94 & 96.

*Primary Examiner*—Jack B. Harvey
*Attorney, Agent, or Firm*—Hilmar L. Fricke

[57] ABSTRACT

An electrical device for measuring the dry film thickness of a paint film applied to a conductive coating adhered to a plastic substrate without destroying the film; the device contains the followintg components: a. an electric sensing device of two separate electrodes isolated from each other and positioned in a material capable of conforming to the surface of the film being measured where the sensing device is placed in contact with the surface of the film and measured under a uniform and reproducible pressure; b. a gain and phase measuring device electrically connected to the sensing device for measuring the gain and phase of an alternating current electrical signal passed from one electrode through the film and conductive coating to the second electrode; c. a device electrically associated with the gain and phase measuring device which measures the gain and phase signals of the overall circuit of the two electrodes, the paint film and conductive coating and from the gain and phase signals calculates the thickness of the paint film and the resistance of the conductive coating.

12 Claims, 6 Drawing Sheets

CONTACT MEASURING DEVICE FOR DETERMINING THE DRY FILM THICKNESS OF A PAINT ON A CONDUCTIVE PRIMER ADHERED TO A PLASTIC SUBSTRATE

BACKGROUND OF THE INVENTION

The present invention is directed to a device for measuring the thickness of a dry paint film applied to a plastic non-metallic substrate without destroying the paint film. In particular, the device may be used to measure the dry paint film thickness of a paint applied by conventional or electrostatic spraying to a plastic substrate primed with a conductive primer.

In the spray application of many paints particularly on plastic substrates, a relatively thin film is formed near the edge of the article being coated and is substantially thicker in the center of the article. This difference in thickness of the paint film results in appearance changes from the center to the edge of the article. This is a problem in the coating of articles, such as auto or truck body panels or facia, in which a uniform appearance is desired, and in particular is a problem for paint panels which are used as color standards in laboratories, paint manufacturing plants and automotive and truck assembly plants. In particular, rejects of paint panels to be used for color standards can be as high as 66% of the panels coated for such uses. Current methods for testing for film thickness destroy the film. There is no good and accurate non-destructive method or device for quickly and accurately measuring the paint film on a plastic substrate.

There is a need for a dry film thickness measuring device for plastic substrates which does not destroy the film and accurately measures the paint film thickness on plastic substrates.

SUMMARY OF THE INVENTION

An electrical device for measuring the dry film thickness of a paint film applied to a conductive coating adhered to a plastic substrate without destroying the film which device contains the following components:

a. an electric sensing means of two separate electrodes isolated from each other and positioned in a material capable of conforming to the surface of the film being measured where the sensing means are placed in contact with the surface of the film and measured under a uniform and reproducible pressure;

b. a gain and phase measuring device electrically connected to said sensing means for measuring the gain and phase of an alternating current electrical signal passed from one electrode through the film and conductive coating to the second electrode;

c. means electrically associated with the gain and phase measuring device which measures the gain and phase signals of the overall circuit of two electrodes, paint film and conductive coating and from the gain and phase signals calculates the thickness of the paint film and the resistance of the conductive coating layer.

DETAILED DESCRIPTION OF THE INVENTION

The principal advantage of the present invention is to provide a device that measures the thickness of a dry paint film applied on a plastic substrate without destroying or damaging the film or the substrate. The device may be used in combination with a device for controlling the thickness of the film when applied. The device also has the advantage of being independent of the optical reflectivity and scattering properties of the film. The device measures the thickness of a dry film applied to a plastic or other non-metallic substrates to an accuracy of 12 microns (0.1 mils) or better. The device can be used to accurately measure the dry film thickness of different types of paint films, such as glossy, flat, and metal-flake containing paints.

Figure 1:
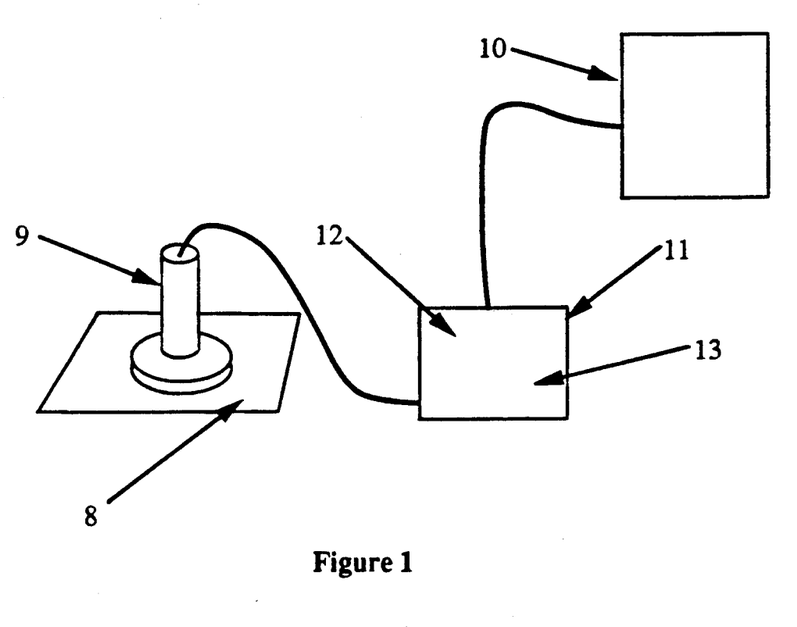
FIG. 1 is a schematic illustration of the device of the invention showing a probe assembly, a gain-phase meter, oscillator and power supply and a computer.
Figure 2:
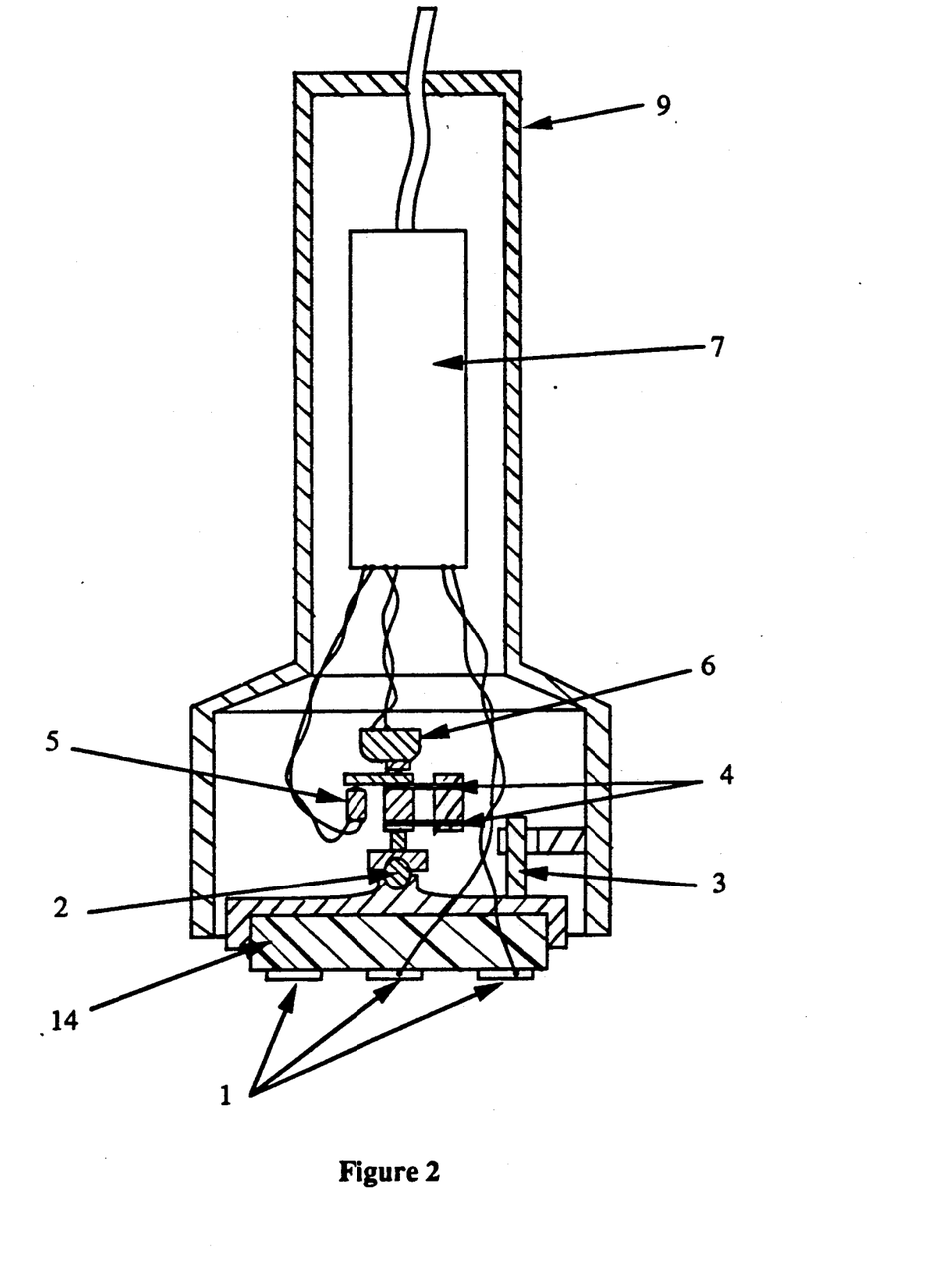
FIG. 2 is a cross section of the probe assembly of FIG. 1.

Referring now to FIG. 1, the overall view of the invention, the hand held probe assembly 9 further described in FIG. 2, is electrically connected to a direct current power supply 11, the gain-phase meter 12 which typically is a Hewlett-Packard 3575A gain-phase meter and an oscillator 13 which typically is a Hewlett-Packard 8116A function generator. The gain-phase meter 11 is connected to the computer 10. The sample 8 which typically is a dried paint layer is in intimate contact with the probe 9. The computer 10 which typically is an Apple Macintosh II with two National Instruments Corporation NB-DI024 interface boards, a PP-GPIB controller board and a Labview operating system is used to interpret and display the data and is the human interface to the present invention. It is also possible to tie the output to a central data acquisition system.

FIG. 2 is a cross section of the hand held probe 9, of FIG. 1. The electrode assembly 1 contains two electrodes of a central disk and concentric ring that are isolated from each other. Typically, the electrodes are formed by etching copper foil that is adhered to a compliant non-conductive support film to form the electrodes. Typically, a "Pyralux" flexible circuit board of a conductive copper layer and polyamide or polyimide substrate is used. This electrode assembly is able to conform to contours of painted plastic parts such as an automobile fascia. This assembly is shown in greater detail in FIG. 3. The electrode assembly 1 is backed up with a resilient elastomer, 14, such as Specialty Composites Corp., C-42 "Confor" which is a medium density open polyurethane foam to force the electrode assembly to conform to the shape of the sample. A flexible joint 2 allows the electrode assembly to self align with the surface to be measured. An anti-rotation pin 3 is attached to the electrode assembly to prevent rotation of the assembly. A flexure pivot 4 is used to measure force applied to the painted substrate. The correct force is detected via microswitch 6 which activates the computer 10 to take a reading. Microswitch 5 is set for an overload and can flag the computer, if desired. Electrical signals are amplified by electronics 7 which typically contains an amplifier which boosts the signal level over the cables connected to the gain phase meter 12 and the oscillator 13.

Figure 3:
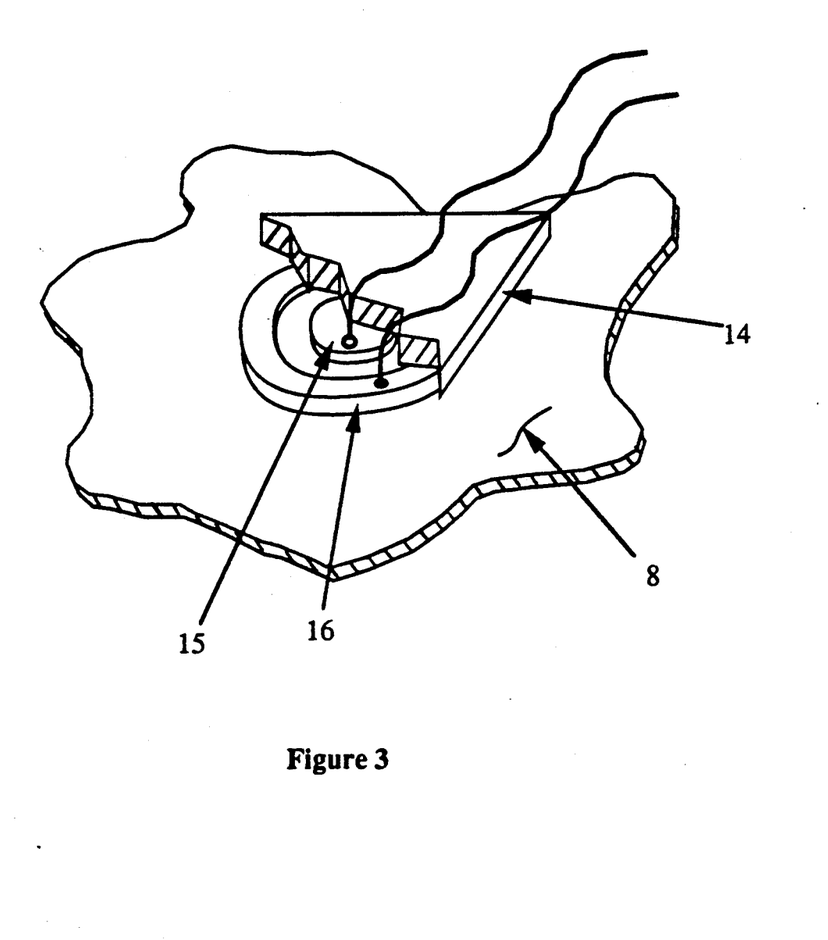
FIG. 3 is a detailed view of a concentric ring assembly used in the probe of FIG. 2.

FIG. 3 shows the electrode assembly 1 of FIG. 2. The disk and concentric ring electrodes 15 and 16 which are insulated from each other. Typically, the electrodes are of a flexible copper foil and the foil is attached to a compliant plastic such, as a polyamide or a polyimide. An even force of the compliant elastomer, 14, pushes the disk electrodes and ring against the substrate, 8. Typically, a downward force of about 5 to 15 pounds on the probe is used.

Figure 4:
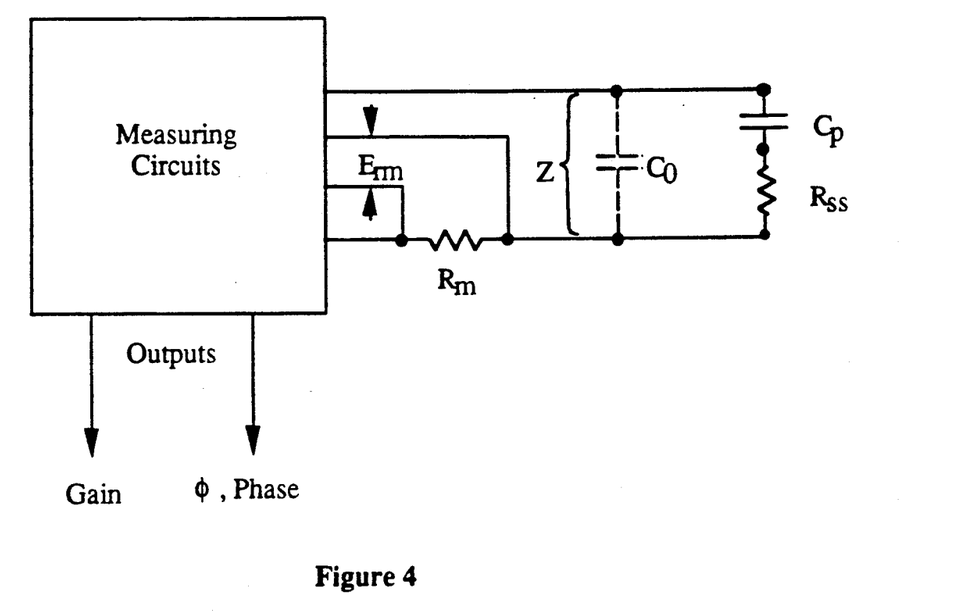
FIG. 4 is a schematic diagram of the measuring circuit.

FIG. 4 is a block diagram of the model of the circuit used in the invention. $C_p$ and $R_{ss}$ represent the measured capacitance and resistance of the paint film and the conductive primer film. Portions of the measuring circuits are contained within the head of the probe 9, of FIG. 1.

The specific configuration disclosed herein is effective for measuring the thickness of various types of paints, such as glossy, flat and metal-flake containing paints.

Although not shown, the device of the present invention may include means for controlling the film thickness. An example of this type of device is disclosed in Falcoff, U.S. Pat. No. 4,702,931, the entire disclosure of which is incorporated herein by reference. The film thickness control device can be used in operable association with the device of the present invention in order to vary the amount of paint to be applied to a next substrate in accordance with the paint film thickness measurement taken on a previous substrate.

Typically, in an operation for painting auto or truck body panels or the like, a series of articles are spray painted automatically and in succession by a machine, such as a robot to obtain a uniform paint film thickness on the surface of each of the articles. However, several factors cause variations in film thickness such as paint viscosity, paint flow rate, atomization pressure at the paint nozzle, various temperature gradations in the surroundings, air flow, and humidity. Since these factors tend to fluctuate, the film thickness may have a wide variation in a given time period of operation. Therefore, it becomes critical that the paint film thickness be monitored at regular, desirable intervals. At any time, when variation in the film thickness is detected, one or more of these factors may be adjusted in order to obtain the desired paint film thickness.

The block diagram and model circuit of FIG. 4 illustrate the concept of the device of this invention. The measuring circuit's output quantities are referred to as "gain" and "phase". Gain and phase are defined by equations Ia and Ib, below:

$$\text{Gain} = 20 \log_{10}\left(\frac{|Z|}{R_m}\right) \qquad \text{(Equation Ia)}$$

where:
Z = probe circuit impedance
$R_m$ = metering resistor in probe $$\phi \text{ Phase} = \text{arc tan}\left[\frac{XC_p}{R_{ss}}\right] \qquad \text{(Equation Ib)}$$

where:
$XC_p$ = capacitive reactance
$C_p$ = paint film capacitance
$R_{ss}$ = resistance of conductive coating The gain is function of the ratio of the impedance, Z, which is a variable and the value of the metering resistor, $R_m$. A typical value for $R_m$ is 100 ohms. When logarithmic quantities are used, as indicated, the effect of the metering resistor is accounted for by subtracting a constant from the gain number. The phase value is virtually unaffected by the metering resistor because the resistor value is very small compared to the value of the impedance, Z.

Frequency is an implicit variable in this invention because the circuit impedance Z, the gain, and the phase $\phi$, all change with frequency. However, if a measurement of film thickness is desired, a single measurement of gain and phase at the frequency fc will suffice. Typically, good measurements of capacitance can be made at frequencies between 1 and 30 kHz. The data presented in following Table 1 was obtained at a frequency of 10 kHz. The value of the capacitance is computed from the impedance value by means of equations IIa, IIb, and IIc, below:

$$|Z| = R_m \cdot 10^{(Gain/20)} \qquad \text{(Equation IIa)}$$

$$X = |Z| \cdot \sin \phi \qquad \text{(Equation IIb)}$$

$$C_p = -\frac{1}{2\pi f_c \cdot X} \qquad \text{(Equation IIc)}$$

where:
$C_p$ is the capacitance of the paint film,
fc is the measuring frequency,
Z is the circuit impedance,
X is the circuit reactance,
$R_m$ is the resistance of the fixed measuring resistor.

Figure 5:
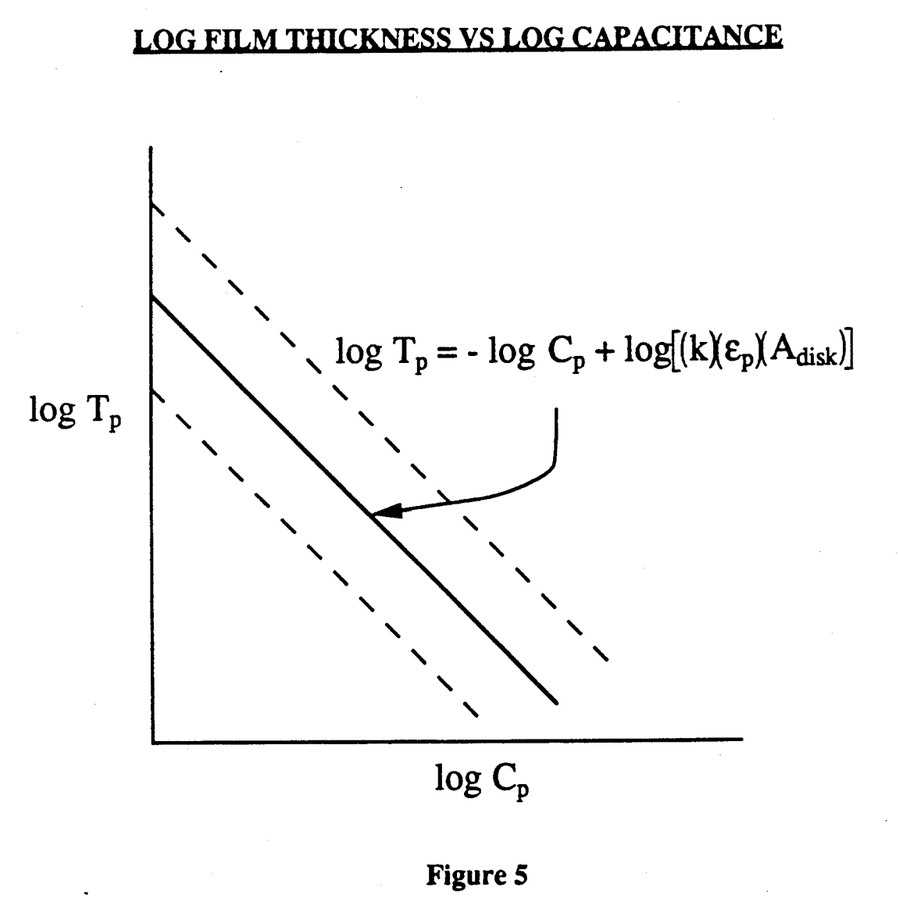
FIG. 5 is a graphical representation of the log of the film thickness plotted vs. the log of the film capacitance.

The resistance of the conductive coating which typically is a primer is derived by the following equation II(d):

$$R_{ss} = |Z| \cdot \cos \phi \qquad \text{(Equation IId)}$$

where:
$R_{ss}$ is resistance of the conductive coating
Z is circuit impedance
$\phi$ is phase angle When the capacitance of the film is known, data such as is schematically shown in FIG. 5 is used to compute film thickness. This figure is based on the fundamental equation for capacitance of parallel plates separated by a given distance, $T_p$, as shown in equation III.

$$C_p = \frac{1}{T_p} \cdot [(k)(\epsilon_p)(A_{disk})] \qquad \text{(Equation III)}$$

$C_p$ is the capacitance of the paint film,
$T_p$ is the film thickness,
k is a constant based on the physical dimensions of the instrument,
$\epsilon_p$ is the permitivity of the dielectric material in the capacitor,
$A_{disk}$ is the area of the parallel plates.

The scale factor, k, depends on the physical metrics in the experiment and the factor, $\epsilon_p$, is the permitivity of the dielectric material in the capacitor, $A_{disk}$ is the area of the parallel plates, or in this case, approximately the area of the disk or center electrode in the paint sensor head. The intercept on the ordinate in FIG. 5 is experimentally determined by measuring known film thickness. The dashed, parallel lines are included to demonstrate the fact that different materials may have different permitivities.

In operation of the device of this invention, it is calibrated by placing a known value of resistance such as a 19.6 K ohm resistor across the two electrodes of the probe, i.e., the central disk and the concentric ring. When the 19.6 K ohm resistor is used, the gain phase meter has the following readings:

gain = +1.09 dB
phase = −0.6 degrees

Theoretical gain in the absence of amplification is calculated from Equation Ia above as follows:

$$Gain = 20 \log(19600 + 100)/100 = 45.89 \text{ dB}$$

The gain and phase correction factors are calculated as follows:

Gain correction factor = theoretical gain − measured gain
= 45.89 − 1.09 = 44.80 dB Phase correction factor = − measured phase
= −(−0.6) = +0.6 degrees The following are calculations for determining the values for panel Ia of Table I below using the device of this invention:

measured gain = 18.85 dB
measured phase = −56.47 degrees corrected gain = measured gain + correction factor
= 18.85 + 44.80 = 63.65 dB corrected phase = measured phase + correction factor
= −56.47 + 0.6 = −55.87

$$|Z| = R_m \cdot 10^{(Gain/20)} = 100 \cdot 10^{(63.65/20)}$$
$$= 152{,}230 \text{ ohms}$$

$$X = |Z| \cdot \sin \phi = 152{,}230(\sin -55.87)$$
$$= -126{,}011 \text{ ohms}$$

$$C_p = -\frac{1}{2\pi f_c X} = -\frac{1}{2\pi \cdot 10{,}000 \cdot -126{,}011} = 126.3 \text{ pF}$$

$$R_{ss} = |Z| \cdot \cos \phi = 152{,}230(\cos -55.87)$$
$$= 85.4 \text{ K ohms}$$

The paint film thickness is determined by above Equation III.

In practical operation of the device, the gain and phase values and correction factors for each are fed into a computer programmed with the above equations and values are calculated by the computer.

Figure 6:
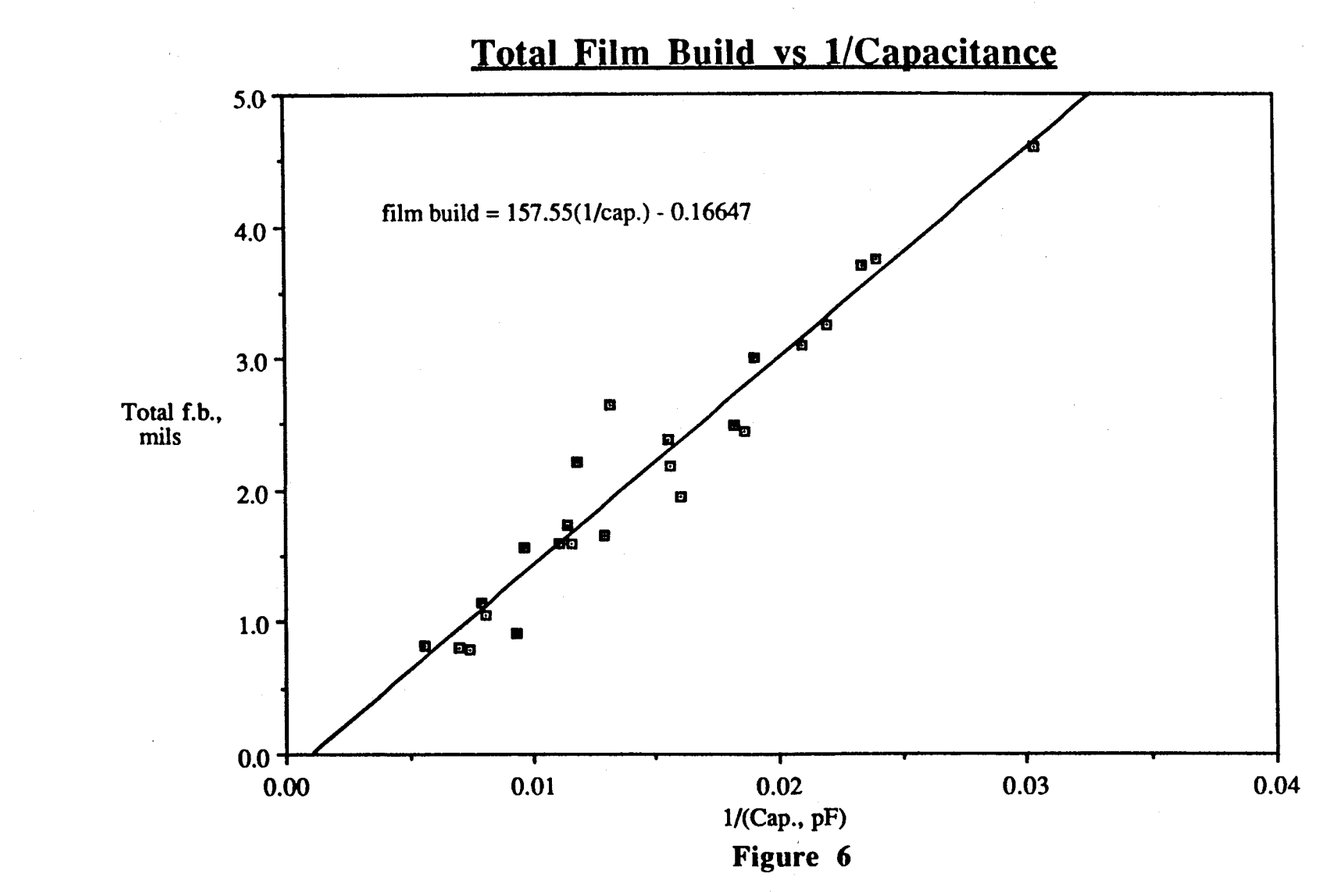
FIG. 6 is a plot of experimental data of film thickness vs (1/capacitance) using the equipment of this invention to obtain the capacitance data.

Table I shows data taken from three different 871 Line basecoat/clearcoat paints. The colors for the paints are gunmetal metallic, tan metallic, and brown metallic. Each of the paints were sprayed over a Mobay #110-25 RIM (reinforced injection molded) plastic substrate with 15% glass filler, with a nominal 1 mil thick PPG HSP-9469 conductive primer layer between the topcoat and substrate. During spraying, a row of plastic samples was physically bracketed by metallic panels; the film thickness of the metallic panels was measured by conventional eddy current means using a Fisherscope meter and the film thickness of the plastic samples between the two metal panels assumed to be the same. The capacitance values of the plastic panels was obtained using the instrument of the invention. The data is plotted in FIG. 6. The correlation coefficient of implied total film build vs. (1/capacitance) is 0.94 and shows the viability of this measuring technique.

TABLE I

| Panel ID | Total film build mils | Capacitance, pF. | 1 Capacitance | Resistance Kohm |
|---|---|---|---|---|
| Gunmetal metallic | | | | |
| 1A | 1.15 | 126.3 | 0.0079 | 85.4 |
| 2A | 2.64 | 75.5 | 0.0132 | 163.0 |
| 3A | 2.21 | 84.4 | 0.0118 | 86.9 |
| 4A | 3.10 | 47.6 | 0.0210 | 246.5 |
| 5A | 3.70 | 42.7 | 0.0234 | 149.1 |
| 6A | 4.59 | 32.8 | 0.0305 | 119.3 |
| 7A | 1.06 | 123.5 | 0.0081 | 162.3 |
| 8A | 1.95 | 62.4 | 0.0160 | 206.5 |
| Tan metallic | | | | |
| 9A | 0.82 | 178.3 | 0.0056 | 70.1 |
| 10A | 1.57 | 103.0 | 0.0097 | 122.9 |
| 11A | 1.74 | 89.5 | 0.0114 | 69.0 |
| 12A | 3.00 | 52.4 | 0.0191 | 121.4 |
| 13A | 2.49 | 54.9 | 0.0182 | 177.3 |
| 14A | 3.75 | 41.7 | 0.0240 | 137.2 |
| 15A | 0.92 | 106.4 | 0.0094 | 98.5 |
| 16A | 2.18 | 63.9 | 0.0156 | 150.2 |
| Brown metallic | | | | |
| 17A | 0.80 | 141.9 | 0.0070 | 100.6 |
| 18A | 1.60 | 85.7 | 0.0117 | 139.2 |
| 19A | 1.59 | 89.9 | 0.0111 | 78.3 |
| 20A | 2.45 | 53.6 | 0.0187 | 136.6 |
| 21A | 2.39 | 64.4 | 0.0155 | 148.9 |
| 22A | 3.25 | 45.5 | 0.0220 | 154.0 |
| 23A | 0.79 | 133.9 | 0.0075 | 63.4 |
| 24A | 1.65 | 77.3 | 0.0129 | 118.7 |

From the regression equation of the above data:
Total film thickness

Eqn. IV $$mils = \left(\frac{157.6}{C_p}\right) - 0.166$$

where:
$C_p$ = paint film capacitance

Alternate to using the equation III, equation IV may be used to determine film thickness of unknown samples after the slope and intercept is determined from a controlled calibration.

While this invention has been described as having a preferred design, it is understood that it is capable of further modifications, uses and/or adaptations of the invention following in general the principle of the invention and including such departures from the present disclosure as may come within known or customary practice in the art to which the invention pertains, and as may be applied to the essential features set forth, and fall within the scope of the invention or the limits of the appended claims.

What is claimed is:

1. An electrical device for measuring the dry film thickness of a paint film applied to a conductive coating adhered to a plastic substrate without destroying the film; the device comprises the following components:
   a. an electric sensing means comprising two separate electrodes isolated from each other and positioned in a material capable of conforming to the surface of the film being measured where the sensing means are placed in contact with the surface of the film and a measurement is made under a uniform and reproducible pressure;
   b. a gain and phase measuring device electrically connected to said sensing means for measuring the gain and phase of an alternating current electrical signal passed from one electrode through the film and conductive coating to the second electrode;
   c. means electrically associated with the gain and phase measuring device which measures the gain and phase signals of the overall electric circuit comprising the two electrodes and conductive coating and the paint film and from the gain and phase signals calculates the thickness of the paint film and the resistance of the conductive coating.

2. The electrical device of claim 1 in which the electric sensing means comprise two separate electrodes wherein one electrode is in the shape of a disc and the second electrode is in the shape of a concentric ring surrounding the disc and separated from the disc by a uniform insulating space.

3. The electrical device of claim 2 in which the sensing means are mounted on a compliant polymeric substrate which conforms to the surface being measured.

4. The electrical device of claim 3 in which the device contains a portable probe assembly which houses the electrical sensing means mounted on a compliant polymeric substrate and has an amplifier connected to the electrical sensing means which is electrically connected to the gain and phase measuring device.

5. The electrical device of claim 4 in which the gain and phase measuring device is a gain phase meter mounted separate from the probe assembly and electrically connected to the probe assembly.

6. The electrical device of claim 5 in which the gain phase meter is connected to an oscillator and a direct current power supply.

7. The electrical device of claim 5 in which the means associated with the gain phase meter which calculates the thickness of the paint film and conductive coating resistance is a computer.

8. The electrical device of claim 1 in which the electrical sensing means are housed in a portable probe assembly and the sensing means are mounted on a compliant polymeric substrate which conforms to the surface being measured and the sensing means comprising two separate electrodes wherein one electrode is in the shape of a disc and the second electrode is in the shape of a concentric ring surrounding the disc and separated from the disc by a uniform insulating space and the probe assembly contains an amplifier electrically connected to the sensing means and to the gain and phase measuring device which is electrically connected to an oscillator and a direct current supply and wherein the means associated with the gain and phase measuring device comprises a computer which is electrically connected to the gain and phase measuring device for calculating paint film thickness and conductive coating resistance and in which the probe assembly contains a microswitch that is activated to make a measurement when the correct force is applied to the probe assembly and contains a second microswitch which is activated when an overload of force is applied to the probe assembly which deactivates the probe assembly.

9. An electrical device for measuring the dry film thickness of a paint film applied to a conductive coating adhered to a plastic substrate without destroying the film; the device comprises the following components:
   a. a portable probe assembly;
   b. an electrical sensing means housed in the probe assembly in which the electric sensing means comprise two separate electrode wherein one electrode is in the shape of a disc and the second electrode is in the shape of a concentric ring surrounding the disc and separated from the disc by a uniform insulating space and in which the sensing means are mounted on a compliant polymeric substrate which conforms to the surface of the film being measured and where the sensing means are placed in contact with the surface of the film and a measurement is made under a uniform and reproducible pressure;
   c. a microswitch electrically connected to the sensing means positioned in the probe assembly that is activated to make a measurement when the correct force is applied to the probe assembly and a second microswitch which is activated when an overload of force is applied to the probe assembly and deactivates the probe assembly;
   d. an amplifier electrically connected to the sensing means;
   e. a gain and phase measuring device electrically connected to said amplifier and sensing means for measuring the gain and phase of an alternating current electrical signal passed from one electrode through the film and conductive coating to the second electrode;
   f. means electrically associated with the gain and phase measuring device which measures the gain and phase signals of the overall electric circuit comprising the two electrode and conductive coating and the paint film and from the gain and phase signals calculates the thickness of the paint film and the resistance of the conductive coating.

10. The electrical device of claim 9 in which the gain and phase measuring device is a gain phase meter mounted separate from the probe assembly and electrically connected to the probe assembly.

11. The electrical device of claim 10 in which the gain phase meter is connected to an oscillator and a direct current power supply.

12. The electrical device of claim 10 in which the means associated with the gain phase meter which calculates the thickness of the paint film and conductive coating resistance is a computer.

* * * * *